(12) United States Patent
Smith

(10) Patent No.: US 6,355,169 B1
(45) Date of Patent: Mar. 12, 2002

(54) OIL FILTER ADAPTER RING

(75) Inventor: Gerald F. Smith, Mound, MN (US)

(73) Assignee: Vortex International, LLC, Peoria, IL (US)

( * ) Notice: Subject to any disclaimer, the term of this patent is extended or adjusted under 35 U.S.C. 154(b) by 0 days.

(21) Appl. No.: 09/559,007

(22) Filed: Apr. 24, 2000

(51) Int. Cl.[7] .............................................. B01D 24/00
(52) U.S. Cl. ................. 210/249; 210/443; 210/DIG. 17
(58) Field of Search ................................ 210/168, 232, 210/DIG. 17, 440, 443, 444, 249; 123/196 A; 184/6.24; 285/148.18, 148.23, 356, 357

(56) References Cited

U.S. PATENT DOCUMENTS

| | | | |
|---|---|---|---|
| 3,282,429 A | * 11/1966 | Wood et al. | ......... 210/DIG. 17 |
| 3,773,180 A | * 11/1973 | Harrison | ...................... 210/315 |
| 5,569,373 A | 10/1996 | Smith et al. | |
| 5,623,755 A | * 4/1997 | Childress et al. | ........... 210/248 |
| 5,830,371 A | 11/1998 | Smith et al. | |

FOREIGN PATENT DOCUMENTS

| | | | | |
|---|---|---|---|---|
| FR | 2475118 A | * | 8/1981 | ........... F01M/11/03 |
| WO | WO-95/11072 A | * | 4/1995 | ........... B01D/27/00 |

OTHER PUBLICATIONS

NAPA Gold Master Filter Catalog 9790, Jan. 1999.

* cited by examiner

Primary Examiner—Matthew O. Savage
(74) Attorney, Agent, or Firm—Rider, Bennett, Egan & Arundel

(57) ABSTRACT

An oil filter adapter ring for mounting between the oil filter receptacle of an engine and an oil filter canister consists of a disc having an external diameter substantially equal to the external diameter of the canister o-ring; a ring having an external diameter substantially equal to the external diameter of the disc, with the ring engaging the disc and the canister o-ring and cooperating with the disc and the canister o-ring to form a channel for oil passage; a number of adapter oil inlets traversing the disc; an adapter oil outlet traversing the disc; and an adapter o-ring sealing to the connector ring. The oil filter adapter ring permits mounting a larger filter canister than was designed for the engine on the oil filter receptacle.

2 Claims, 4 Drawing Sheets

OIL FILTER ADAPTER RING

BACKGROUND OF THE INVENTION

This invention relates to filters for filtering fluids such as engine oil, coolant, fuel, hydraulic or transmission fluid. Fluid filters are used to remove contaminants from fluid.

Fluid filters are used to remove contaminants from fluid such as engine oil. Internal combustion engines use oil to lubricate bearings and reduce friction. This oil is circulated through the engine and carries contaminants such as metal particles, carbon particles and dirt that may cause harm to the engine. In order to effectively lubricate the engine, engine oil is passed through a filter to remove the contaminants before the oil is recirculated into the engine. The typical oil filter is attached to an internal combustion engine at the oil filter receptacle. Engine oil passes through a discharge opening in the oil filter receptacle, into a fluid filter and then into the engine lubrication system through an oil inlet pipe. A filter element in the fluid filter removes contaminates from the oil before it reenters the engine through the oil inlet pipe. Because of the dynamic nature of this process, oil filters must be sealed to protect from oil leaking into the atmosphere.

Oil filters have traditionally been of a disposable type creating a great environmental concern. Used oil filters are disposed of in landfills or by incinerating. Recent improvements in the art have separated the filter elements from the filter canister allowing users to dispose of only the filter element and thus reducing the quantity of waste material. However, a large volume of waste is still generated by disposing of the filter element.

Various engine manufacturers, such as Caterpillar Detroit, etc., use different arrangements for attaching oil filters to their engine blocks. The different mount necessitates additional cost to produce and distribute oil filters. The supply of filters for various engine manufacturers involves the remanufacture of major components of an oil filter or an entire filter assembly in order to adapt a filter product to a particular engine.

There is a need for a fluid filter for filtering a variety of fluids which features a reusable filter element and which can easily be adapted to different connection configurations, especially for use in engines as oil filters.

There is a need in the automotive industry to allow oil filters that are much larger than those designed specifically for a given engine to be mounted on that engine. Provided that enough clearance space is available in the engine, the larger the filter that can be mounted on the engine, the more surface area is available for filtering and the more efficient the filtering process.

SUMMARY OF THE INVENTION

An oil filter adapter ring for mounting between the oil filter receptacle of an engine and an oil filter canister, the oil filter receptacle having a connector ring, an unfiltered oil outlet, and a filtered oil tube, the canister having an o-ring, the o-ring having an internal diameter and an external diameter, the oil filter adapter ring comprising:

a) a disc having an external diameter substantially equal to the external diameter of the canister o-ring;

b) a ring having an external diameter substantially equal to the external diameter of the disc, the ring engaging the disc and the canister o-ring and cooperating with the disc and the canister o-ring to form a channel therebetween;

c) a plurality of adapter oil inlets traversing the disc;

d) an adapter oil outlet traversing the disc; and e) an adapter o-ring sealingly engaging the connector ring wherein the external diameter of the connector ring is less than the internal diameter of the canister o-ring.

A principal object and advantage of the present invention is to allow the use of a larger oil filter than was designed for use on a particular engine, to provide increased filtering.

Further features and advantages of the invention are pointed out with the description of the preferred embodiment, drawings and claims of this application.

DETAILED DESCRIPTION OF PREFERRED EMBODIMENTS

Figure 1:
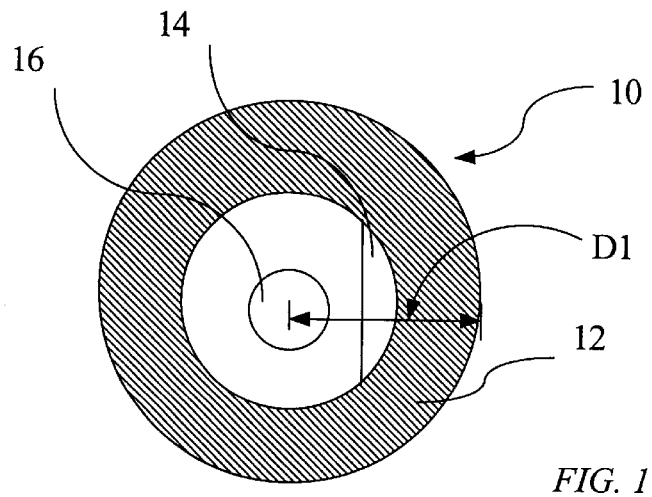
FIG. 1 is bottom view of the engine oil filter receptacle of the prior art.

A bottom view of the engine oil filter receptacle of an engine is shown in FIG. 1. As can be seen, the engine oil filter receptacle 10 has connector ring 12, unfiltered oil outlet 14, and filtered oil tube 16. Unfiltered oil from the engine comes out of the engine through the unfiltered oil outlet 14 and filtered oil returns to the engine through filtered oil tube 16. Filtered oil tube 16 is generally externally threaded to mate with the internal threads of an oil filter. Oil filter receptacle 10 has an external diameter D1.

Figure 2:
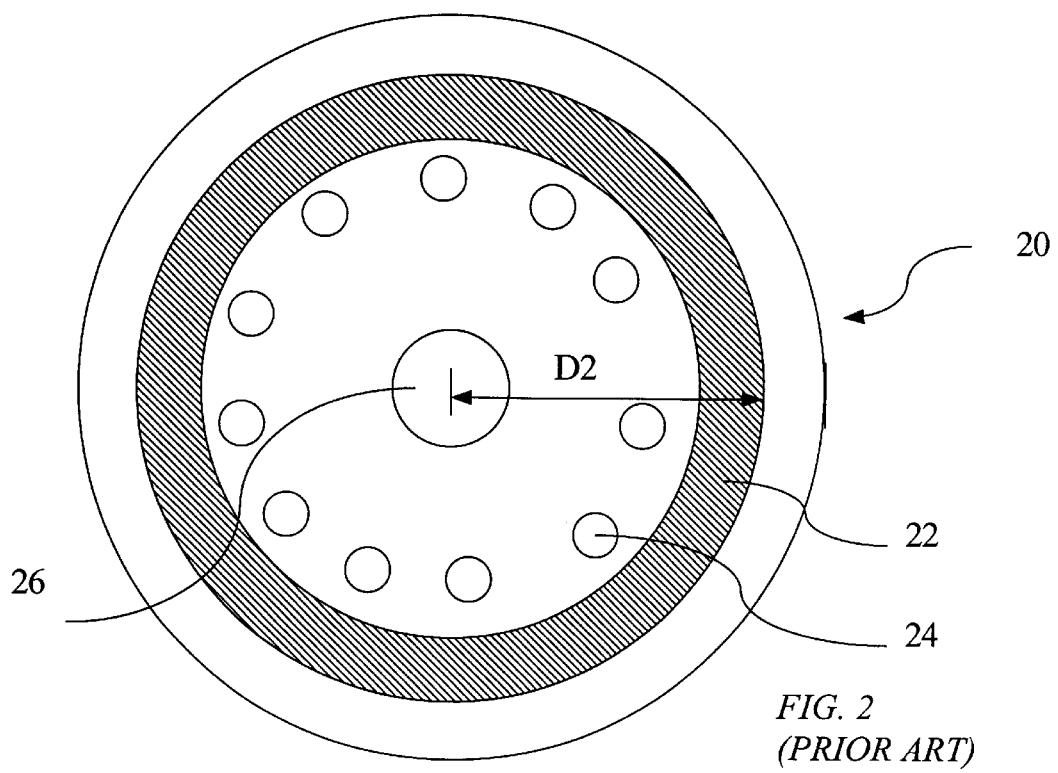
FIG. 2 is a top view of an oil filter of the prior art.
Figure 3:
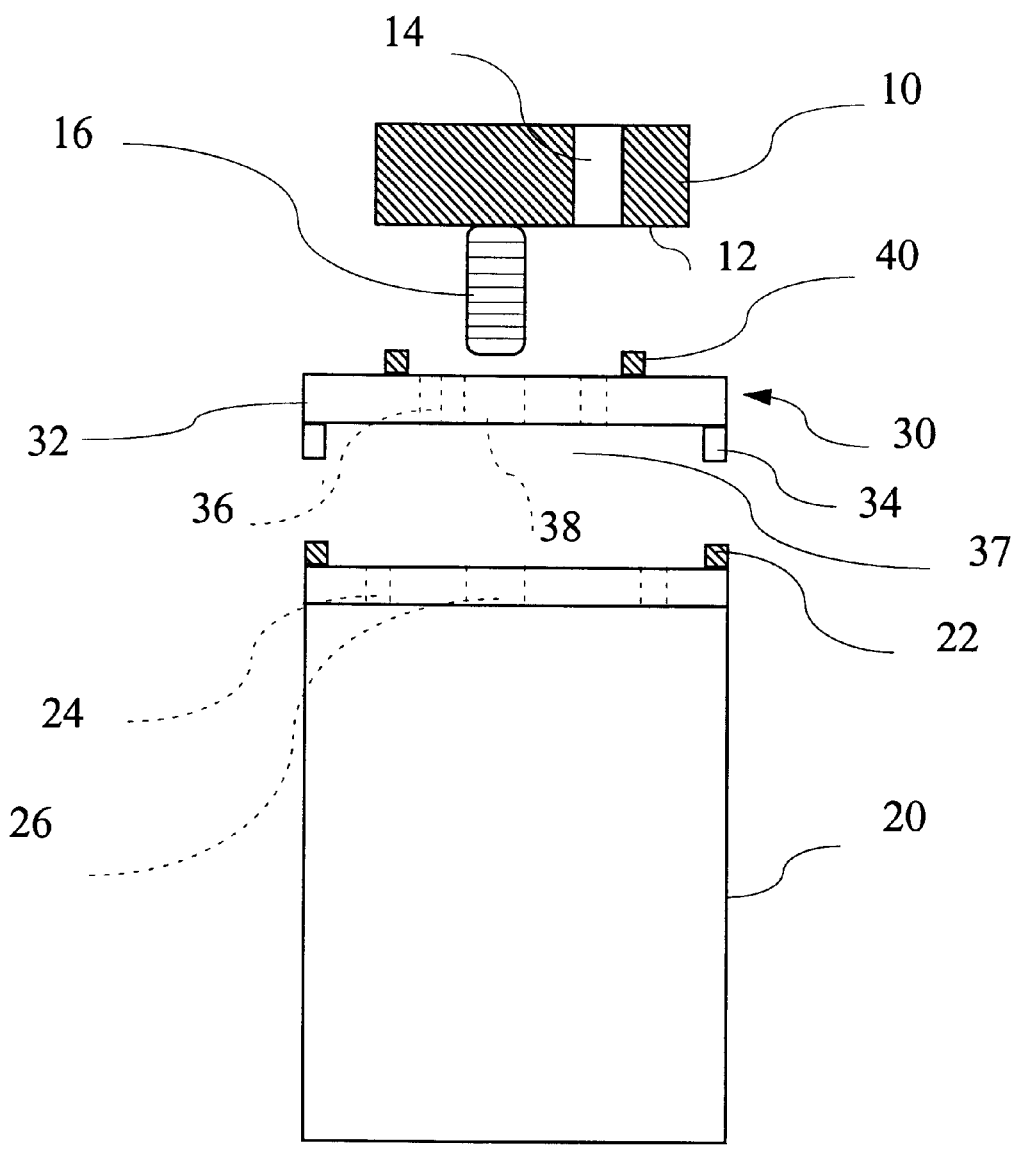
FIG. 3 is a schematic perspective view of the oil filter adapter ring of the present invention, showing its use with the prior art oil filter receptacle of FIG. 1 and the prior art oil filter of FIG. 2.

A top view of a prior art oil filter canister is shown in FIG. 2. The oil filter canister 20 has canister o-ring 22, unfiltered oil inlets 24, and filtered oil outlet 26. Filtered oil outlet 26 is generally internally threaded to mate with the filtered oil tube 16. Canister o-ring has external diameter D2, larger than external diameter D1 of the oil filter receptacle.

There is a need in the automotive industry to allow oil filters 20 that are much larger than those designed specifically for a given engine to be mounted on that engine. Provided that enough clearance space is available in the engine, the larger the filter that can be mounted on the engine, the more surface area is available for filtering and the more efficient the filtering process.

However, it can be readily seen by superimposing FIG. 1 on FIG. 2, that a large oil filter cannot be directly mounted on an engine oil connection that is smaller than that filter was designed for. A variety of problems may occur. For example, oil from the unfiltered oil outlet 14 may be blocked from reaching the unfiltered oil inlets 24 by the ring 14. Alternatively, oil from the engine may leak out from between the ring 14 and the canister o-ring 22, because they do not align.

The present invention addresses the above problem.

Figure 4:
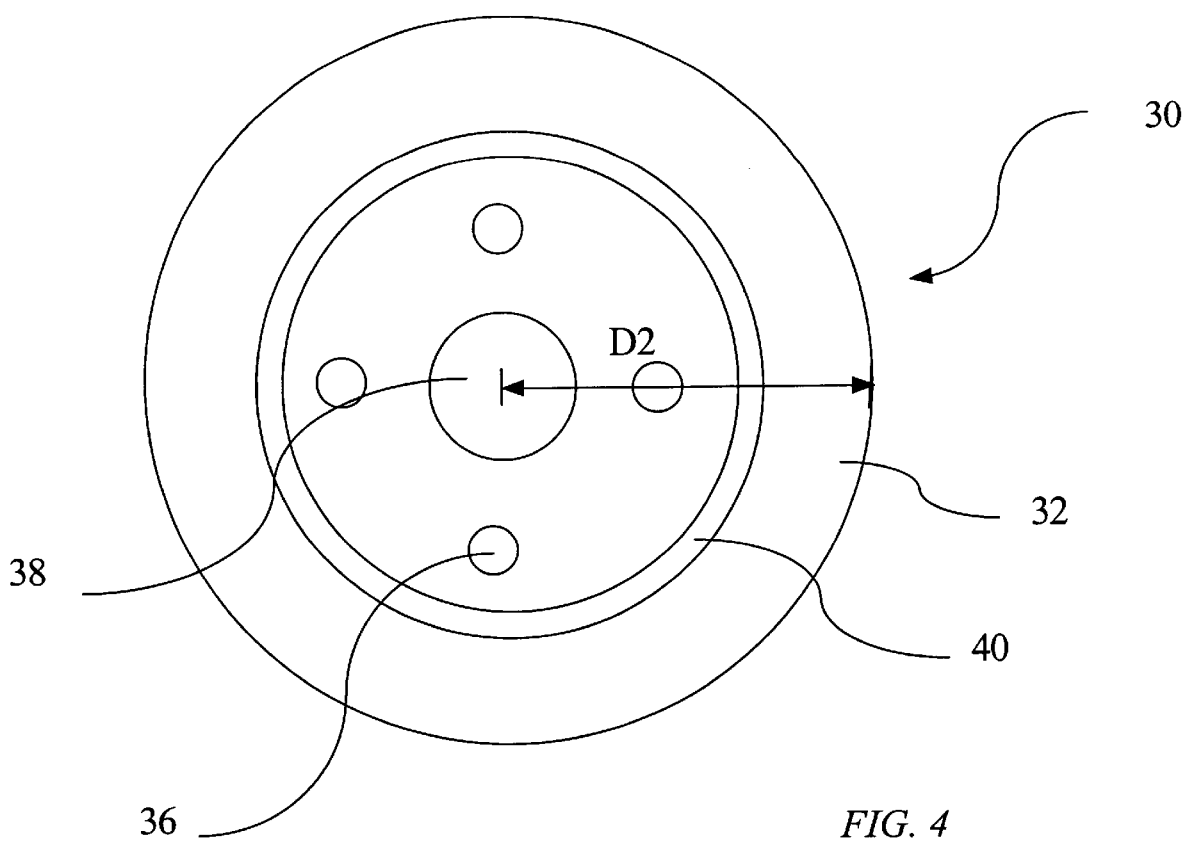
FIG. 4 is a top plan view of the oil filter adapter ring.
Figure 5:
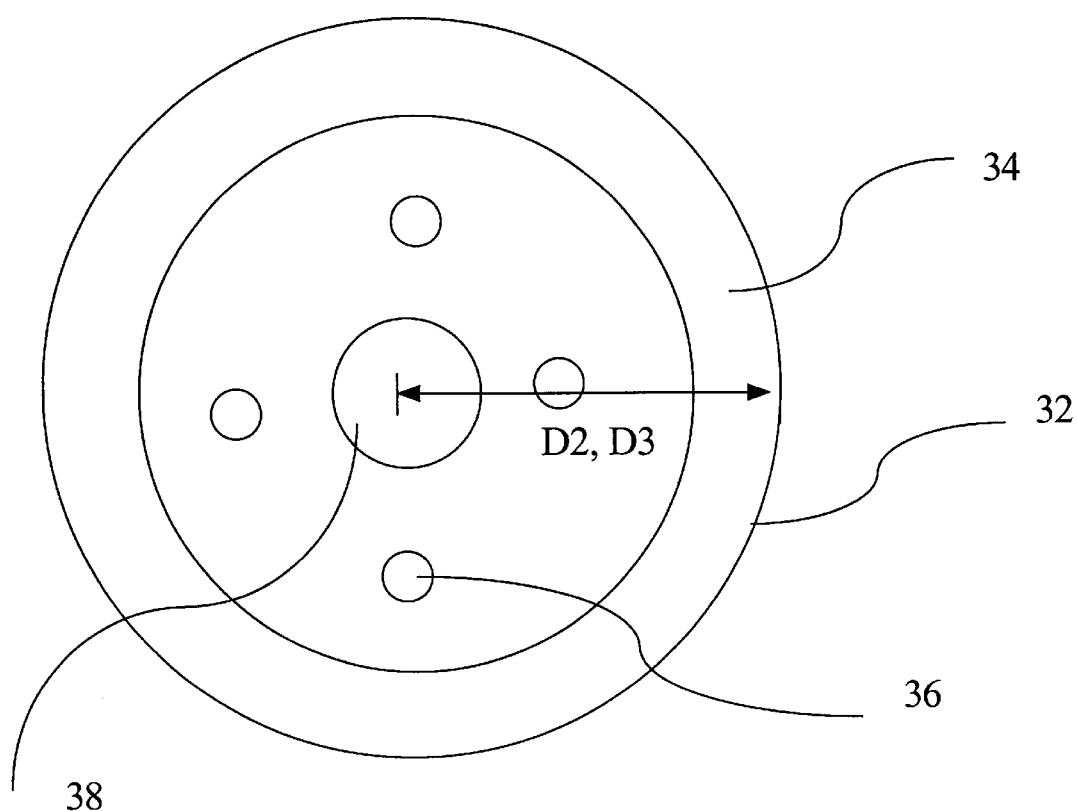
FIG. 5 is a bottom plan view of the oil filter adapter ring.

The oil filter adapter ring 30 comprises a disc 32 having an external diameter D2 (FIG. 4) substantially equal to the external diameter D2 of the canister o-ring 22. A ring 34 having an external diameter D3 substantially equal to the external diameter D2 of the disc 32 may be formed in or mounted on the disc 32 between the disc 32 and the canister o-ring 22. The ring 34, disc 32, and canister o-ring 22 cooperate to form a channel 37 therebetween for the passage of oil. In some circumstances, the ring 34 may not be necessary if sufficient clearance remains between the canister 20 and the adapter ring 30 after the canister 20 is tightened onto the oil filter receptacle 10.

The oil filter adapter ring 30 further comprises a plurality of adapter oil inlets 36 traversing the disc 32 and receiving oil from the unfiltered oil outlet 14 of the engine oil filter receptacle.

The oil filter adapter ring 30 further comprises an adapter oil outlet 38 traversing the disc and receiving the filtered oil tube 16 of the engine oil filter receptacle. The adapter oil outlet may be internally threaded to receive the external threads of the filtered oil tube 16.

The oil filter adapter ring 30 further comprises an adapter o-ring 40 sealingly engaging the connector ring 12 of the engine oil filter receptacle.

In operation, the oil filter adapter ring 30 is mounted onto the engine oil filter receptacle 10 with the adapter o-ring 40 sealingly engaging the connector ring 12 of the engine oil filter receptacle 10, and the engine's filtered oil tube 16 entering the adapter oil outlet 38. Then the oil filter canister 20 is threaded onto the filtered oil tube 16, such that the canister o-ring sealingly engages the ring 34 of the oil filter adapter ring.

Unfiltered oil from the engine enters the canister 20 and its internal filter (not shown) from the unfiltered oil outlet 14 after passing through the adapter oil inlet 36 and unfiltered oil inlets 24. The channel 37 allows oil to pass freely from the unfiltered oil outlet 14 to the adapter oil inlet 36. After the oil is filtered in the canister, it returns through the filtered oil tube 16 to the engine oil filter receptacle 10.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An oil filter adapter ring in combination with the oil filter receptacle of an engine and an oil filter canister, the oil filter receptacle having a connector ring, an unfiltered oil outlet, and a filtered oil tube, the canister having an o-ring, the o-ring having an internal diameter and an external diameter, the oil filter adapter ring comprising:

a) a disc having an external diameter substantially equal to the external diameter of the canister o-ring;
    b) a plurality of adapter oil inlets traversing the disc;
    c) an adapter oil outlet traversing the disc; and
    d) an adapter o-ring sealingly engaging the connector ring; and
    e) a second having an external diameter substantially equal to the external diameter of the disc, the second ring engaging the disc and the canister o-ring and cooperating with the disc and the canister o-ring to form a channel therebetween wherein said plurality of adapter oil inlets open into said channel at a position that is radially inwardly disposed of an internal diameter of said second ring, wherein the external diameter of the connector ring is less than the internal diameter of the canister o-ring.

2. The oil filter adapter ring of claim 1, wherein the adapter oil outlet has internal threads that engage external threads on the engine's filtered oil tube.

\* \* \* \* \*

UNITED STATES PATENT AND TRADEMARK OFFICE
CERTIFICATE OF CORRECTION

PATENT NO. : 6,355,169 B1  
DATED : March 12, 2002  
INVENTOR(S) : Gerald F. Smith It is certified that error appears in the above-identified patent and that said Letters Patent is hereby corrected as shown below:

<u>Column 4,</u>
Line 19, after the word "second", please insert -- ring --.

Signed and Sealed this

First Day of April, 2003

JAMES E. ROGAN  
*Director of the United States Patent and Trademark Office*